United States Patent
Nagakura et al.

(10) Patent No.: US 11,426,635 B2
(45) Date of Patent: Aug. 30, 2022

(54) GOLF BALL

(71) Applicant: Sumitomo Rubber Industries, Ltd., Kobe (JP)

(72) Inventors: Hikaru Nagakura, Kobe (JP); Kazuyoshi Shiga, Kobe (JP); Kai Hayashi, Kobe (JP); Takahiro Shigemitsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/212,335

(22) Filed: Mar. 25, 2021

(65) Prior Publication Data

US 2021/0299522 A1 Sep. 30, 2021

(30) Foreign Application Priority Data

Mar. 27, 2020 (JP) .............................. JP2020-057918

(51) Int. Cl.
*A63B 37/06* (2006.01)
*A63B 37/00* (2006.01)
*C08L 9/00* (2006.01)

(52) U.S. Cl.
CPC ...... *A63B 37/0051* (2013.01); *A63B 37/0063* (2013.01); *A63B 37/0066* (2013.01); *A63B 37/0074* (2013.01); *A63B 37/00621* (2020.08); *A63B 37/00622* (2020.08); *C08L 9/00* (2013.01)

(58) Field of Classification Search
CPC .......................... A63B 37/005; A63B 37/0063
USPC .......................................................... 473/351
See application file for complete search history.

(56) References Cited

U.S. PATENT DOCUMENTS

| | | | |
|---|---|---|---|
| 2015/0065268 A1 | 3/2015 | Nakajima et al. | |
| 2020/0001142 A1* | 1/2020 | Yamanaka | A63B 37/0063 |
| 2020/0002514 A1* | 1/2020 | Yamanaka | C08L 9/00 |

FOREIGN PATENT DOCUMENTS

| | | |
|---|---|---|
| JP | 63-212377 A | 9/1988 |
| JP | 2001-149504 A | 6/2001 |
| JP | 2004-121815 A | 4/2004 |
| JP | 2015-47502 A | 3/2015 |
| JP | 2015-77405 A | 4/2015 |

* cited by examiner

*Primary Examiner* — Raeann Gorden
(74) *Attorney, Agent, or Firm* — Birch, Stewart, Kolasch & Birch, LLP

(57) ABSTRACT

An object of the present invention is to provide a golf ball having excellent durability and good shot feeling. The present invention provides a golf ball comprising a core, wherein a difference (crosslinking density at surface of core−crosslinking density at center of core) between a crosslinking density at a surface of the core and a crosslinking density at a center of the core is more than $1.0 \times 10^2$ mol/m$^3$ and less than $9.0 \times 10^2$ mol/m$^3$, and a hardness difference (Hs−Ho) between Hs and Ho is 13.0 or more and 30.0 or less, and the core satisfies H50−Ho>Hs−H50, wherein Hs (Shore C hardness) is a hardness at the surface of the core, Ho (Shore C hardness) is a hardness at the center of the core, and H50 (Shore C hardness) is a hardness at a midpoint between the center of the core and the surface of the core.

16 Claims, 1 Drawing Sheet

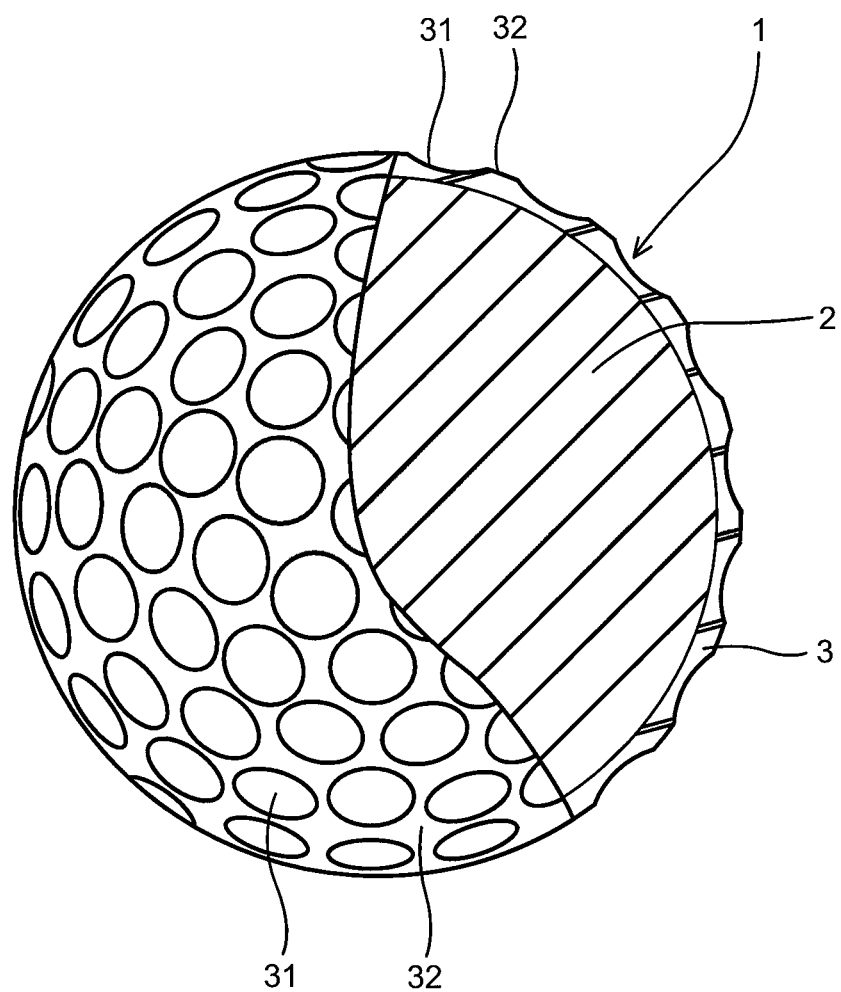

GOLF BALL

FIELD OF THE INVENTION

The present invention relates to a golf ball, and more specifically relates to a technology for improving a core of a golf ball.

DESCRIPTION OF THE RELATED ART

As a material for forming a core of a golf ball, a rubber composition containing a base rubber, a co-crosslinking agent and a crosslinking initiator is widely used in light of its good resilience.

For example, JP 2015-077405 A discloses a golf ball comprising a core and a cover composed of at least one layer, wherein the core has a cross-sectional hardness which, letting R (mm) be a radius of the core, A be a JIS-C hardness at a center of the core, B be a JIS-C hardness at a position R/3 mm from the core center, C be a JIS-C hardness at a position R/1.8 mm from the core center, D be a JIS-C hardness at a position R/1.3 mm from the core center, and E be a JIS-C hardness at a surface of the core, satisfies formulas (1) to (4) below:

$$D-C \geq 7 \tag{1}$$

$$C-B \leq 7 \tag{2}$$

$$(D-C)-(C-B) \geq 7, \tag{3}$$

and $$E-A \geq 16. \tag{4}$$

In addition, JP 2015-047502 A discloses a golf ball comprising a core and a cover composed of one layer or a plurality of layers, wherein the core is formed from a heat-molded product of a rubber composition containing the following components (A) to (C):

(A) a base rubber,
(B) an organic peroxide, and
(C) water and/or a metal monocarboxylate; and wherein a product (P×E) of a difference P (mol/m$^3$) in a crosslinking density between a surface of the core and a center of the core measured based on a toluene swelling test, multiplied by a deflection E (mm) of the core when compressed under a final load of 1275 N (130 kgf) from an initial load state of 98 N (10 kgf) is 28×10$^2$ mol/m$^3$ mm or more.

JP 2001-149504 A discloses a one-piece golf ball comprising a ball body formed from a white rubber composition containing a base rubber, an α,β-unsaturated carboxylic acid and/or a metal salt thereof and an organic peroxide, and a clear coat applied on a surface of the ball body, wherein the white rubber composition is a rubber composition containing an antioxidant in an amount from 0.1 to 5.0 parts by mass and a light stabilizer in an amount from 0.05 to 3.0 parts by mass with respect to 100 parts by mass of the base rubber, and the clear coat contains a UV absorber in an amount from 0.05 to 5.0 parts by mass with respect to 100 parts by mass of a resin component.

JP 2004-121815 A discloses a golf ball comprising, as a constituent element, a heat-molded product of a rubber composition containing a polybutadiene including a cis-1,4 bond in an amount of 60 weight % or more and having a Mooney viscosity (ML$_{1+4}$ (100° C.)) of 40 or more, an unsaturated carboxylic acid and/or a metal salt thereof, an organic peroxide, and a monophenol-based antioxidant.

JP S63-212377 A discloses a solid golf ball comprising, as at least one part, an elastic portion formed from a rubber composition containing a base rubber, a metal salt of an α,β-ethylenically unsaturated carboxylic acid, an ethylenically unsaturated carboxylic acid ester having a hindered phenol group, and a peroxide.

SUMMARY OF THE INVENTION

An object of the present invention is to provide a golf ball having excellent durability and good shot feeling.

The present invention provides a golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, and (c) a crosslinking initiator, a difference (crosslinking density at surface of core−crosslinking density at center of core) between a crosslinking density at a surface of the core and a crosslinking density at a center of the core is more than 1.0×10$^2$ mol/m$^3$ and less than 9.0×10$^2$ mol/m$^3$, and a hardness difference (Hs−Ho) between Hs and Ho is 13.0 or more and 30.0 or less, and the core satisfies H50−Ho>Hs−H50, wherein Hs (Shore C hardness) is a hardness at the surface of the core, Ho (Shore C hardness) is a hardness at the center of the core, and H50 (Shore C hardness) is a hardness at a midpoint between the center of the core and the surface of the core. In other words, the golf ball according to the present invention is characterized in that the crosslinking density difference between the core surface and the core center is below a certain value while the hardness difference between the core surface and the core center is above a certain value. A golf ball comprising such core has good shot feeling while having excellent durability.

According to the present invention, a golf ball having excellent durability and good shot feeling is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a core and at least one cover layer covering the core, wherein the core is formed from a core rubber composition containing (a) a base rubber, (b) an α,β-unsaturated carboxylic acid having 3 to 8 carbon atoms and/or a metal salt thereof as a co-crosslinking agent, and (c) a crosslinking initiator, a difference (crosslinking density at surface of core−crosslinking density at center of core) between a crosslinking density at a surface of the core and a crosslinking density at a center of the core is more than 1.0×10$^2$ mol/m$^3$ and less than 9.0×10$^2$ mol/m$^3$, and a hardness difference (Hs−Ho) between Hs and Ho is 13.0 or more and 30.0 or less, and the core satisfies H50−Ho>Hs−H50, wherein Hs (Shore C hardness) is a hardness at the surface of the core, Ho (Shore C hardness) is a hardness at the center of the core, and H50 (Shore C hardness) is a hardness at a midpoint between the center of the core and the surface of the core.

The core of the golf ball according to the present invention is formed from a core rubber composition containing (a) a base rubber, (b) an α,β-unsaturated carboxylic acid having 3 to 8 carbon atoms and/or a metal salt thereof as a co-crosslinking agent, and (c) a crosslinking initiator. First, the materials used for the core of the golf ball according to the present invention will be explained.

[(a) Base Rubber]

As (a) the base rubber, a natural rubber and/or a synthetic rubber is used. For example, a polybutadiene rubber, a natural rubber, a polyisoprene rubber, a styrene polybutadiene rubber, or an ethylene-propylene-diene rubber (EPDM) can be used. These rubbers may be used solely, or at least two of these rubbers may be used in combination. Among them, particularly preferred is a high-cis polybutadiene having a cis-1,4 bond in an amount of 40 mass % or more, preferably 80 mass % or more, more preferably 90 mass % or more, and even more preferably 95 mass % or more in view of their superior resilience.

From the viewpoint of obtaining a core having higher resilience, the amount of the high-cis polybutadiene in the base rubber is preferably 60 mass % or more, more preferably 80 mass % or more, and even more preferably 90 mass % or more. It is also preferable that (a) the base rubber consists of the high-cis polybutadiene.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene preferably includes a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 55 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

[(b) Co-Crosslinking Agent]

(b) The α,β-unsaturated carboxylic acid having 3 to 8 carbon atoms and/or the metal salt thereof used in the rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid and crotonic acid.

Examples of the metal constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ion such as tin and zirconium. The above metal component may be used solely or as a mixture of at least two of them. Among them, the divalent metal ion such as magnesium, calcium, zinc, barium and cadmium is preferably used as the metal component. This is because if the divalent metal salt of the α,β-unsaturated carboxylic acid having 3 to 8 carbon atoms is used, a metal crosslinking easily generates between the rubber molecules. Especially, as the divalent metal salt, zinc acrylate is preferable, because use of zinc acrylate enhances the resilience of the obtained golf ball. It is noted that the α,β-unsaturated carboxylic acid having 3 to 8 carbon atoms and/or the metal salt thereof may be used solely or as a mixture of at least two of them.

The amount of (b) the α,β-unsaturated carboxylic acid having 3 to 8 carbon atoms and/or the metal salt thereof is preferably 20 parts by mass or more, more preferably 25 parts by mass or more, and even more preferably 30 parts by mass or more, and is preferably 55 parts by mass or less, more preferably 50 parts by mass or less, and even more preferably 45 parts by mass or less, with respect to 100 parts by mass of (a) the base rubber. If the amount of (b) the α,β-unsaturated carboxylic acid having 3 to 8 carbon atoms and/or the metal salt thereof is less than 20 parts by mass, the amount of (c) the crosslinking initiator which will be described later must be increased such that the cured product (e.g. core) formed from the rubber composition has an appropriate hardness, which tends to lower the resilience of the obtained golf ball. On the other hand, if the amount of the α,β-unsaturated carboxylic acid having 3 to 8 carbon atoms and/or the metal salt thereof is more than 55 parts by mass, the cured product (e.g. core) formed from the rubber composition becomes so hard that the shot feeling of the obtained golf ball may be lowered.

[(c) Crosslinking Initiator]

(c) The crosslinking initiator used in the rubber composition is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. These organic peroxides may be used solely or as a mixture of at least two of them. Among them, dicumyl peroxide is preferably used.

In the case that the rubber composition contains at least one of the following components (d), the amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the cured product (e.g. core) formed from the rubber composition is so soft that the resilience of the obtained golf ball tends to be lowered, and if the amount of the crosslinking initiator is more than 5.0 parts by mass, the amount of (b) the co-crosslinking agent described above must be decreased such that the cured product (e.g. core) formed from the rubber composition has an appropriate hardness, which tends to lower the resilience or worsen the durability of the obtained golf ball.

In the case that the rubber composition contains none of the following components (d), the amount of (c) the crosslinking initiator is preferably 0.1 part by mass or less with respect to 100 parts by mass of the base rubber. If the amount of (c) the crosslinking initiator is 0.1 part by mass or less with respect to 100 parts by mass of the base rubber, the crosslinking density is decreased for the amount of the co-crosslinking agent, the strain at break is increased, and the durability is enhanced.

The core rubber composition preferably contains at least one additive (d) selected from the group consisting of (d1) a hindered phenol-based compound, (d2) a hindered amine-based compound, and (d3) a terpene resin. If the core rubber composition contains the component (d), the crosslinking density difference of the core can be made lower while keeping the hardness difference of the core above a certain value.

[(d1) Hindered Phenol-Based Compound]

The hindered phenol-based compound is a compound having a hydroxyphenyl structure with a hydroxy group thereof being sterically protected by a bulky functional group. The bulky functional group preferably exists at a location adjacent to the hydroxy group. Examples of the bulky functional group include t-butyl group, and a long chain alkyl group optionally having a part of the carbon atoms thereof substituted with a sulfur atom. As the hindered phenol-based compound, a compound having a tert-butylhydroxyphenyl structure with at least one tert-butyl group is preferable, a compound having a di-tert-butylhydroxyphenyl structure with two tert-butyl groups is more preferable.

Examples of the compound having the tert-butylhydroxyphenyl structure with at least one tert-butyl group include compounds having a structure such as 3-tert-butyl-4-hydroxyphenyl or 3,5-di-tert-butyl-4-hydroxyphenyl. Among them, the compound having 3,5-di-tert-butyl-4-hydroxyphenyl structure is preferable.

Specific examples of the hindered phenol-based compound include a compound having one hydroxyphenyl structure, such as dibutylhydroxy toluene (BHT), 4,6-bis(octylthiomethyl)-o-cresol, 4,6-bis[(dodecylthio)methyl]-o-cresol, 2,4-dimethyl-6-(1-methylpentadecyl) phenol (e.g. Irganox 1141 available from BASF Japan Ltd.), and octadecyl-3-(3,5-di-t-butyl-4-hydroxyphenyl) propionate (e.g. ADK STAB AO-50 available from Adeka Corporation).

Other specific examples of the hindered phenol-based compound include a compound having two hydroxyphenyl structures, such as 2,2'-methylene bis(4-ethyl-6-tert-butylphenol) (e.g. YOSHINOX 425 available from Mitsubishi Chemical Corporation), 2,2'-methylene bis(4-methyl-6-tert-butylphenol) (e.g. Sandant 2246 available from Sanshin Chemical Industry Co., Ltd.), 4,4'-butylidene bis(3-methyl-6-tert-butylphenol) (e.g. YOSHINOX BB available from Mitsubishi Chemical Corporation), 4,4'-thiobis(3-methyl-6-tert-butylphenol) (e.g. NOCRAC 300 available from Ouchi Shinko Chemical Industrial Co., Ltd.), 4,4'-methylene bis(2,6-di-tert-butylphenol), 2,6-di-tert-butyl-4-({2-[(3,5-di-tert-butyl-4-hydroxyphenyl) sulfanyl]propane-2-yl} sulfanyl) phenol (probucol), and 3,9-bis[2-[3-(3-tert-butyl-4-hydroxy-5-methylphenyl) propionyloxy]-1,1-dimethylethyl]-2,4,8,10-tetraoxaspiro[5.5] undecane (e.g. ADK STAB AO-80 available from Adeka Corporation).

Other specific examples of the hindered phenol-based compound include a compound having three hydroxyphenyl structures, such as 1,3,5-tris-(3,5-di-tert-butyl-4-hydroxybenzyl)-1,3-5-triazine-2,4,6(1H,3H,5H-)-trione (e.g. ADK STAB AO-20 available from Adeka Corporation), and 1,3,5-trimethyl-2,4,6-tris(3,5-di-t-butyl-4-hydroxybenzyl) benzene (e.g. ADK STAB AO330 available from Adeka Corporation).

Other specific examples of the hindered phenol-based compound include a compound having four hydroxyphenyl structures, such as pentaerythritol tetrakis[3-(3,5-di-tert-butyl-4-hydroxyphenyl) propionate] (e.g. ADK STAB AO-60 available from Adeka Corporation).

The hindered phenol-based compound may be used solely, or two or more of them may be used in combination.

As the hindered phenol-based compound, at least one compound selected from the group consisting of dibutylhydroxy toluene, octadecyl-3-(3,5-di-tert-butyl-4-hydroxyphenyl) propionate, 4,4'-methylene bis(2,6-di-tert-butylphenol), 2,6-di-tert-butyl-4-({2-[(3,5-di-tert-butyl-4-hydroxyphenyl) sulfanyl] propane-2-yl} sulfanyl) phenol, 1,3,5-tris(3,5-di-tert-butyl-4-hydroxybenzyl)-1,3,5-triazine-2,4,6-(1H,3H, 5H)-trione, and pentaerythritol tetrakis[3-(3,5-di-tert-butyl-4-hydroxyphenyl) propionate is preferable.

As (d2) the hindered amine-based compound, a compound having 2,2,6,6-tetramethyl-4-piperidyl group represented by the following chemical formula (1) is preferable.

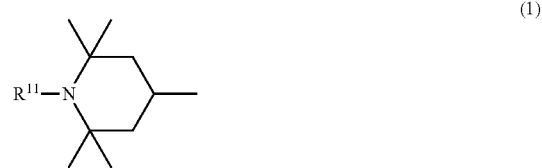

(1)

In the formula (1), $R^{11}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

The hindered amine-based compound represented by the chemical formula (1) includes the hindered amine-based compound as represented by the chemical formula (2) or chemical formula (3).

The hindered amine-based compound represented by the following chemical formula (2) is a so-called N-alkyl type hindered amine-based compound or NH type hindered amine-based compound.

(2)

In the formula (2), $R^{12}$ is a hydrogen atom, a hydroxy group, an alkyl group having 1 to 30 carbon atoms, a hydroxyalkyl group having 1 to 30 carbon atoms, or an oxyradical.

The hindered amine-based compound represented by the following chemical formula (3) is a so-called N-alkoxy type hindered amine compound.

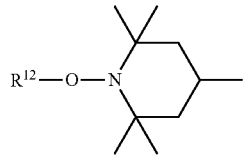
(3)

In the chemical formula (3), $R^{12}$ is an alkyl group having 1 to 30 carbon atoms or a hydroxyalkyl group having 1 to 30 carbon atoms.

Specific examples of (d2) the hindered amine-based compound include compounds represented by the chemical formulae (4) to (6).

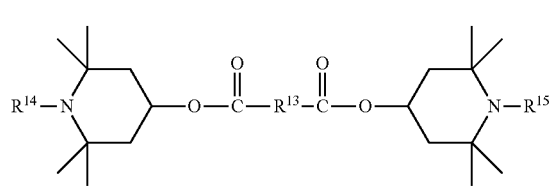
(4)

In the chemical formula (4), $R^{14}$ and $R^{15}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical, and $R^{13}$ is an alkylene group having 1 to 20 carbon atoms.

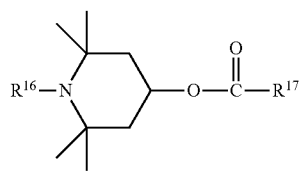
(5)

In the chemical formula (5), $R^{16}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical, and $R^{17}$ is an alkyl group having 1 to 30 carbon atoms, or an alkenyl group having 2 to 30 carbon atoms.

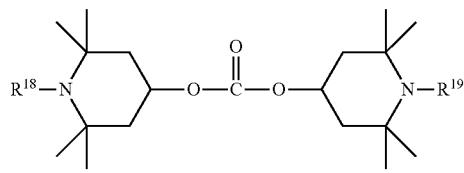
(6)

In the chemical formula (6), $R^{18}$ and $R^{19}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

Specific examples of (d2) the hindered amine-based compound include ADK STAB LA-52 (tetrakis(1,2,2,6,6-pentamethyl-4-piperidyl) butane-1,2,3,4-tetracarboxylate), ADK STAB LA-57 (tetrakis(2,2,6,6-tetramethyl-4-piperidyl) butane-1,2,3,4-tetracarboxylate), ADK STAB LA-63P, ADK STAB LA-68, ADK STAB LA-72 (bis(1,2,2,6,6-pentamethyl-4-piperidyl) sebacate, ADK STAB LA-77Y (bis(2,2,6,6-tetramethyl-4-piperidyl) sebacate, and ADK STAB LA-81 (bis(1-undecanoxy-2,2,6,6-tetramethylpiperidine-4-yl) carbonate available from Adeka Corporation.

Specific examples of (d2) the hindered amine-based compound include the following products available from BASF Japan Ltd.

1) Chimassorb 2020FDL 1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine 2) Chimassorb 944FDL Poly[[6-[(1,1,3,3-tetramethylbutyl) amino]-1,3,5-triazine-2,4-diyl][(2,2,6,6-tetramethyl-4-piperidinyl) imino]-1,6-hexanediyl[(2,2,6,6-tetramethyl-4-piperidinyl) imino]])

3) TINUVIN 622SF

Butanedioic acid, dimethylester, polymer with 4-hydroxy-2,2,6,6-tetramethyl-1-piperidine ethanol)

4) TINUVIN PA144

Bis(1,2,2,6,6-pentamethyl-4-piperidinyl)-2-butyl-2-(4-hydroxy-3,5-di-tert-butylbenzyl) propanedioate (d2) The hindered amine-based compound may be used solely, or two or more of them may be used in combination. In addition, (d1) the hindered phenol-based compound and (d2) the hindered amine-based compound may be used in combination.

In the case that the core rubber composition contains (d1) the hindered phenol-based compound and/or (d2) the hindered amine-based compound as the additive (d), the amount of (d1) the hindered phenol-based compound and/or (d2) the hindered amine-based compound is preferably 1 parts by mass or more, more preferably 2 parts by mass or more, and even more preferably 3 parts by mass or more, and is preferably 15 parts by mass or less, more preferably 13 parts by mass or less, and even more preferably 11 parts by mass or less, with respect to 100 parts by mass of (a) the base rubber. If the amount of (d1) the hindered phenol-based compound and/or (d2) the hindered amine-based compound falls within the above range, the crosslinking density is decreased for the amount of the co-crosslinking agent, the strain at break is increased, and the durability is enhanced.

[(d3) Terpene-Based Resin]

The core rubber composition further preferably contains (d3) a terpene-based resin. If the core rubber composition contains the component (d3), the crosslinking density is lowered while keeping the hardness of the core. The terpene-based resin is not particularly limited, as long as it is a polymer having a terpene compound as a constituent component. As the terpene-based resin, for example, at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer, is preferable.

The terpene polymer is a homopolymer obtained by polymerizing the terpene compound. The terpene compound is a hydrocarbon represented by $(C_5H_8)_n$ or an oxygen-containing derivate thereof, and is a compound having a terpene classified into monoterpene $(C_{10}H_{16})$, sesquiterpene $(C_{15}H_{24})$, diterpene $(C_{20}H_{32})$ or the like, as a basic skeleton. Examples of the terpene compound include α-pinene, β-pinene, dipentene, limonene, myrcene, alloocimene, ocimene, α-phellandrene, α-terpinene, γ-terpinene, terpinolene, 1,8-cineol, 1,4-cineol, α-terpineol, β-terpineol, and γ-terpineol. The terpene compound may be used solely, or at least two or more of them may be used in combination.

The terpene polymer is obtained, for example, by polymerizing the terpene compound. Examples of the terpene polymer include α-pinene polymer, β-pinene polymer, limonene polymer, dipentene polymer, and β-pinene/limonene polymer.

The terpene-phenol copolymer (sometimes referred to as "terpene-phenolic resin") is, for example, a copolymer of the terpene compound and a phenol-based compound. Examples of the phenol-based compound include phenol, cresol, xylenol, catechol, resorcin, hydroquinone, and bisphenol A. As the terpene-phenol copolymer, a copolymer of the terpene compound and phenol is preferable.

The acid value of the terpene-phenol copolymer is preferably 10 mgKOH/g or more, more preferably 35 mgKOH/g or more, and even more preferably 60 mgKOH/g or more. In addition, the acid value of the terpene-phenol copolymer is preferably 300 mgKOH/g or less, more preferably 250 mgKOH/g or less, even more preferably 200 mgKOH/g or less, particularly preferably 150 mgKOH/g or less, and most preferably 90 mgKOH/g or less. It is noted that in the present invention, the acid value of the terpene-phenol copolymer is an amount of potassium hydroxide in milligrams required to neutralize the acid included in one gram of the terpene-phenol copolymer, and is a value measured by a potentiometric titration method (JIS K 0070: 1992).

The hydroxy value of the terpene-phenol copolymer is preferably 30 mgKOH/g or more, more preferably 50 mgKOH/g or more. The hydroxy value of the terpene-phenol copolymer is preferably 150 mgKOH/g or less, more preferably 100 mgKOH/g or less. It is noted that in the present specification, the hydroxy value is an amount of potassium hydroxide in milligrams required to neutralize acetic acid bonding to the hydroxy group when acetylating one gram of the resin, and is a value measured by a potentiometric titration method (JIS K 0070: 1992).

The terpene-styrene copolymer is, for example, a copolymer of the terpene compound and a styrene-based compound. Examples of the styrene-based compound include styrene, and α-methylstyrene. As the terpene-styrene copolymer, a copolymer of the terpene compound and α-methylstyrene is preferable.

The terpene-phenol-styrene copolymer is, for example, a copolymer of the terpene compound, the phenol-based compound and the styrene-based compound. As the terpene-phenol-styrene copolymer, a copolymer of the terpene compound, phenol and α-methylstyrene is preferable.

The hydrogenated terpene-phenol copolymer is obtained by hydrogenating the terpene-phenol copolymer. The hydrogenated terpene-styrene copolymer is obtained by hydrogenating the terpene-styrene copolymer. The hydrogenated terpene-phenol-styrene copolymer is obtained by hydrogenating the terpene-phenol-styrene copolymer.

As (d3) the terpene-based resin, at least one member selected from the group consisting of compounds having a structure represented by the following chemical formulae (7) to (10), is preferable.

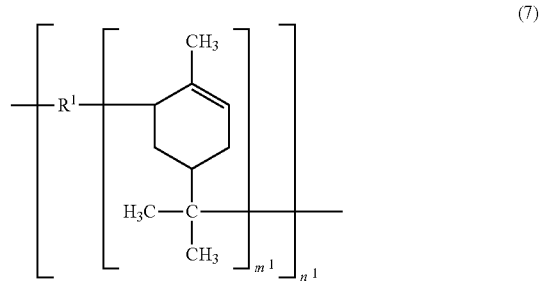

(7)

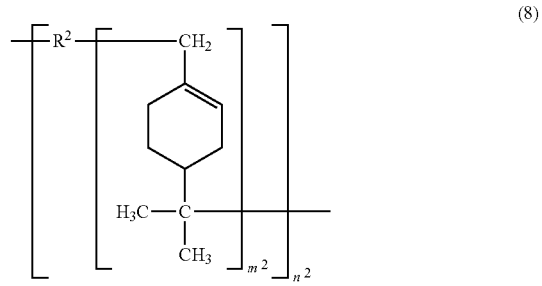

(8)

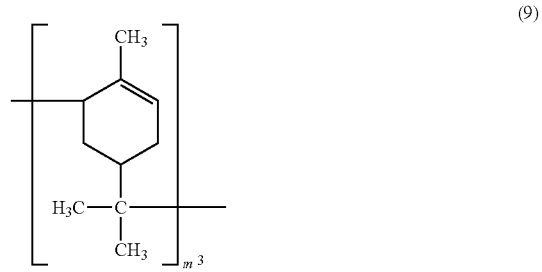

(9)

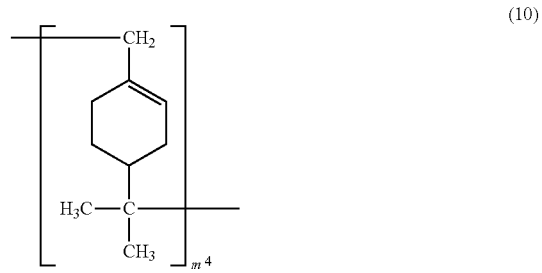

(10)

[In the chemical formulae (7) to (10), $R^1$ and $R^2$ each independently represent a divalent residue of the phenol-based compound and/or styrene-based compound, $m^1$ to $m^4$ each independently represent a natural number of 1 to 30, and $n^1$ to $n^2$ each independently represent a natural number of 1 to 20.]

Each of the compounds having the structure represented by the chemical formulae (7) to (10) has a structure derived from pinene in the molecule.

The compound having the structure represented by the chemical formula (7) has a repeating unit consisting of a structural moiety derived from α-pinene and $R^1$ bonding to the structural moiety derived from α-pinene. $R^1$ is preferably a divalent residue where two hydrogen atoms are removed from benzene ring of a phenol-based compound and/or styrene-based compound. Examples of the compound having the structure represented by the chemical formula (7)

include a copolymer of α-pinene and a phenol-based compound and/or styrene-based compound.

Examples of the phenol-based compound include phenol, cresol, xylenol, catechol, resorcin, hydroquinone, and bisphenol A. Examples of the styrene-based compound include styrene, and α-methylstyrene.

In the chemical formula (7), $m^1$ represents a polymerization degree of the structural unit derived from α-pinene, and is preferably a natural number of 1 to 30. The above $m^1$ is preferably 1 or more, more preferably 2 or more, and even more preferably 3 or more, and is preferably 30 or less, more preferably 25 or less, and even more preferably 20 or less.

In the chemical formula (7), $n^1$ represents a polymerization degree of the repeating unit consisting of the structural moiety derived from α-pinene and $R^1$ bonding to the structural moiety derived from α-pinene, and is preferably a natural number of 1 to 20. The above $n^1$ is preferably 1 or more, more preferably 2 or more, and even more preferably 3 or more, and is preferably 20 or less, more preferably 18 or less, and even more preferably 15 or less.

The compound having the structure represented by the chemical formula (8) has a repeating unit consisting of a structural moiety derived from β-pinene and $R^2$ bonding to this structural moiety in the molecule. Examples of the compound having the structure represented by the chemical formula (8) include a copolymer of β-pinene and a phenol-based compound and/or styrene-based compound. $R^2$ is a divalent residue where two hydrogen atoms are removed from benzene ring of a phenol-based compound and/or styrene-based compound.

Examples of the phenol-based compound include phenol, cresol, xylenol, catechol, resorcin, hydroquinone, and bisphenol A. Examples of the styrene-based compound include styrene, and α-methylstyrene.

In the chemical formula (8), $m^2$ represents a polymerization degree of the structural unit derived from β-pinene, and is preferably a natural number of 1 to 30. The above $m^2$ is preferably 1 or more, more preferably 2 or more, and even more preferably 3 or more, and is preferably 30 or less, more preferably 25 or less, and even more preferably 20 or less.

In the chemical formula (8), $n^2$ represents a polymerization degree of the repeating unit consisting of the structural moiety derived from β-pinene and $R^2$ bonding to this structural moiety, and is preferably a natural number of 1 to 20. The above $n^2$ is preferably 1 or more, more preferably 2 or more, and even more preferably 3 or more, and is preferably 20 or less, more preferably 18 or less, and even more preferably 15 or less.

The compound having the structure represented by the chemical formula (9) is a polymer having a structural unit derived from α-pinene, more preferably a polymer consisting of the structural unit derived from α-pinene.

In the chemical formula (9), $m^3$ represents a polymerization degree of the structural unit derived from α-pinene, and is preferably a natural number of 1 to 30. The above $m^3$ is preferably 1 or more, more preferably 2 or more, and even more preferably 3 or more, and is preferably 30 or less, more preferably 25 or less, and even more preferably 20 or less.

The compound having the structure represented by the chemical formula (10) is a β-pinene polymer having a structural unit derived from β-pinene in the molecule, more preferably a polymer consisting of the structural unit derived from 1-pinene.

In the chemical formula (10), $m^4$ represents a polymerization degree of the structural unit derived from β-pinene, and is preferably a natural number of 1 to 30. The above $m^4$ is preferably 1 or more, more preferably 2 or more, and even more preferably 3 or more, and is preferably 30 or less, more preferably 25 or less, and even more preferably 20 or less.

As (d3) the terpene-based resin, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer are particularly preferable. As (d3) the terpene-based resin, these copolymers may be used solely, or two or more of them may be used in combination.

The softening point of (d3) the terpene-based resin is preferably 60° C. or more, more preferably 80° C. or more, and even more preferably 100° C. or more, and is preferably 150° C. or less, more preferably 130° C. or less, and even more preferably 120° C. or less. If (d3) the terpene-based resin having a softening point falling within the above range is used, the resin has better dispersibility in the rubber kneading. It is noted that the softening point of (d3) the terpene-based resin is measured with a ring and ball type softening point measuring apparatus according to JIS K 6220-1: 2001, and is a temperature at which the ball drops.

As (d3) the terpene-based resin, commercially available products can be used, and examples thereof include Sylvares TP2019 and Sylvatraxx 6720 available from Kraton Corporation; and YS RESIN PX1150N available from Yasuhara Chemical Co., Ltd.

The amount of (d3) the terpene-based resin is preferably 2 parts by mass or more, more preferably 3 parts by mass or more, and even more preferably 4 parts by mass or more, and is preferably 20 parts by mass or less, more preferably 18 parts by mass or less, and even more preferably 15 parts by mass or less, with respect to 100 parts by mass of (a) the base rubber. If the amount of the component (d3) is less than 2 parts by mass, the effect of adding the component (d3) is small and the improvement effect on shot feeling on driver shots may not be obtained. On the other hand, if the amount of the component (d3) is more than 20 parts by mass, the obtained core becomes so soft as a whole that the resilience may be lowered.

The mass ratio of the component (b) to the component (d3) (the component (b)/the component (d3)) is preferably 2.0 or more, more preferably 2.5 or more, and even more preferably 2.8 or more, and is preferably 15.0 or less, more preferably 12.0 or less, even more preferably 10.0 or less, and most preferably 8.0 or less. If the mass ratio of the component (b) to the component (d3) (the component (b)/the component (d3)) falls within the above range, the obtained golf ball has better shot feeling on driver shots.

[(e) Organic Sulfur Compound]

The core rubber composition preferably further contains (e) an organic sulfur compound. If (e) the organic sulfur compound is contained, the obtained core has enhanced resilience.

As (e) the organic sulfur compound, at least one compound selected from the group consisting of thiols (thiophenols, thionaphthols), polysulfides, thiurams, thiocarboxylic acids, dithiocarboxylic acids, sulfenamides, dithiocarbamates, and thiazoles, is preferable.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5- trichlorothiophenol, 2,4,5,6-tetrachlorothiophenol and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,4-diiodothiophenol, 2,5-diiodothiophenol, 2,6-diiodothiophenol, 2,4,5-tiiodothiophenol, 2,4,5,6-tetraiodothiophenol and pentaiodothiophenol; and metal salts thereof. As the metal salt, zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Among them, 2-thionaphthol, 1-thionaphthol, and metal salts thereof are preferable. As the metal salt, a divalent metal salt is preferable, zinc salt is more preferable. Specific examples of the metal salt include zinc salt of 1-thionaphthol and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide; thiuram disulfides such as tetramethylthiuram disulfide, tetraethylthiuram disulfide and tetrabutylthiuram disulfide; and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (e) the organic sulfur compound, the thiophenols and/or the metal salts thereof, the thionaphthols and/or the metal salts thereof, the diphenyl disulfides, and the thiuram disulfides are preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

(e) The organic sulfur compound may be used solely, or two or more of them may be used in combination.

The amount of (e) the organic sulfur compound is preferably 0.05 part by mass or more, more preferably 0.1 part by mass or more, and more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and the resilience of the golf ball may not be enhanced. In addition, if the amount of (e) the organic sulfur compound is more than 5.0 parts by mass, the obtained golf ball has a great compression deformation amount and thus the resilience thereof may be lowered.

[(f) Metal Compound]

The core rubber composition preferably further contains (f) a metal compound. (f) The metal compound can be used as, for example, a weight adjusting agent for the rubber composition, or a neutralizing agent for the α,β-unsaturated carboxylic acid having 3 to 8 carbon atoms.

Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (f) the metal compound, the divalent metal compound is preferable, the zinc compound is more preferable. This is because the divalent metal compound reacts with the α,β-unsaturated carboxylic acid having 3 to 8 carbon atoms to form a metal crosslinking. In addition, if the zinc compound is used, the obtained golf ball has better resilience.

(f) The metal compound may be used solely, or at least two of them may be used in combination. In addition, the amount of (f) the metal compound may be appropriately adjusted according to the desired neutralization degree of (b) the α,β-unsaturated carboxylic acid having 3 to 8 carbon atoms.

The core rubber composition may further contain an additive such as a pigment, a filler for adjusting weight or the like, an antioxidant, a peptizing agent, and a softener, where necessary.

The filler blended in the core rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder. As the filler, zinc oxide is particularly preferable. It is considered that zinc oxide acts as a vulcanizing aid to increase the hardness of the core as a whole. The amount of the filler is preferably 0.5 part by mass or more, more preferably 1 part by mass or more, and is preferably 30 parts by mass or less, more preferably 25 parts by mass or less, and even more preferably 20 parts by mass or less with respect to 100 parts by mass of (a) the base rubber. If the amount of the filler is less than 0.5 part by mass, it is difficult to adjust the weight, and if the amount of the filler is more than 30 parts by mass, the weight proportion of the rubber component is decreased and thus the resilience tends to be lowered.

The amount of the peptizing agent is preferably 0.1 part by mass or more and 5 parts by mass or less with respect to 100 parts by mass of (a) the base rubber.

The golf ball according to the present invention is a golf ball comprising a core and at least one cover layer covering the core, wherein the core is formed from the above core rubber composition.

In the golf ball according to the present invention, a difference (crosslinking density at surface of core−crosslinking density at center of core) between a crosslinking density at a surface of the core and a crosslinking density at a center of the core is more than $1.0 \times 10^2$ mol/m$^3$ and less than $9.0 \times 10^2$ mol/m$^3$, and a hardness difference (Hs−Ho) between Hs and Ho is 13.0 or more and 30.0 or less, and the core satisfies H50−Ho>Hs−H50, wherein Hs (Shore C hardness) is a hardness at the surface of the core, Ho (Shore C hardness) is a hardness at the center of the core, and H50 (Shore C hardness) is a hardness at a midpoint between the center of the core and the surface of the core.

In the golf ball according to the present invention, the difference (crosslinking density at surface of core−crosslinking density at center of core) between the crosslinking density at the surface of the core and the crosslinking density at the center of the core is preferably more than $1.0 \times 10^2$ mol/m$^3$, more preferably $1.5 \times 10^2$ mol/m$^3$ or more, and even more preferably $2.0 \times 10^2$ mol/m$^3$ or more, and is preferably less than $9.0 \times 10^2$ mol/m$^3$, more preferably $8.9 \times 10^2$ mol/m$^3$ or less, and even more preferably $8.8 \times 10^2$ mol/m$^3$ or less. If the difference (crosslinking density at surface of core−crosslinking density at center of core) between the crosslinking density at the surface of the core and the crosslinking density at the center of the core falls within the above range, the feeling is better while the durability is maintained.

The crosslinking density at the surface of the core is preferably $9.0 \times 10^2$ mol/m$^3$ or more, more preferably $9.5 \times 10^2$ mol/m$^3$ or more, and even more preferably $10.0 \times 10^2$ mol/m$^3$ or more, and is preferably $22.0 \times 10^2$ mol/m$^3$ or less, more preferably $21.0 \times 10^2$ mol/m$^3$ or less, and even more preferably $20.0 \times 10^2$ mol/m$^3$ or less. If the crosslinking density at the surface of the core falls within the above range, the rubber composition is not excessively hard and thus the feeling is better.

The crosslinking density at the center of the core is preferably $4.0 \times 10^2$ mol/m$^3$ or more, more preferably $4.5 \times 10^2$ mol/m$^3$ or more, and even more preferably $5.0 \times 10^2$ mol/m$^3$ or more, and is preferably $13.0 \times 10^2$ mol/m$^3$ or less, more preferably $12.0 \times 10^2$ mol/m$^3$ or less, and even more preferably $11.0 \times 10^2$ mol/m$^3$ or less. If crosslinking density at the center of the core falls within the above range, the rubber composition is not excessively soft and thus the resilience can be maintained.

In the golf ball according to the present invention, the hardness difference (Hs−Ho) between Hs and Ho is 13.0 or more and 30.0 or less, and the core satisfies H50−Ho>Hs−H50, wherein Hs (Shore C hardness) is the hardness at the surface of the core, Ho (Shore C hardness) is the hardness at the center of the core, and H50 (Shore C hardness) is the hardness at the midpoint between the center of the core and the surface of the core.

If the core hardness satisfies H50−Ho>Hs−H50, the feeling is good while the resilience performance is maintained. Herein, the hardness Ho at the center of the core is a hardness at the central point of a cut plane that includes the central point of the core and is obtained by cutting the core into two equal parts, and the hardness H50 at the midpoint between the center of the core and the surface of the core is a hardness at a point of 50% of the core radius from the central point of the cut plane.

The hardness difference (H50−Ho) between the hardness H50 at the midpoint of the core and the hardness Ho at the center of the core is preferably 1.0 or more, more preferably 2.0 or more, and even more preferably 3.0 or more, and is preferably 20.0 or less, more preferably 19.0 or less, and even more preferably 18.0 or less in Shore C hardness.

The hardness difference (Hs−H50) between the hardness Hs at the surface of the core and the hardness H50 at the midpoint of the core is preferably 0 or more, more preferably 0.3 or more, and even more preferably 0.5 or more, and is preferably 15.0 or less, more preferably 14.0 or less, and even more preferably 13.0 or less in Shore C hardness.

The hardness difference (Hs−Ho) between the hardness at the surface of the core (Hs) and the hardness at the center of the core (Ho) is preferably 13.0 or more, more preferably 14.0 or more, and even more preferably 15.0 or more, and is preferably 30.0 or less, more preferably 28.0 or less, and even more preferably 26.0 or less in Shore C hardness. If the hardness difference (Hs−Ho) between the hardness at the surface of the core (Hs) and the hardness at the center of the core (Ho) is 13.0 or more in Shore C hardness, the durability can be maintained (enhanced). In addition, if the hardness difference (Hs−Ho) between the hardness at the surface of the core (Hs) and the hardness at the center of the core (Ho) is 30.0 or less in Shore C hardness, the obtained golf ball has better shot feeling on driver shots.

The hardness at the surface of the core (Hs) is preferably 60.0 or more, more preferably 65.0 or more, and even more preferably 70.0 or more, and is preferably 90.0 or less, more preferably 88.0 or less, and even more preferably 85.0 or less in Shore C hardness. If the hardness at the surface of the core (Hs) is 60.0 or more in Shore C hardness, the core has better resilience. In addition, if the hardness at the surface of the core (Hs) is 90.0 or less in Shore C hardness, the core has better shot feeling on driver shots.

The hardness at the center of the core (Ho) is preferably 30.0 or more, more preferably 35.0 or more, and even more preferably 40.0 or more in Shore C hardness. If the hardness at the center of the core (Ho) is 30.0 or more in Shore C hardness, the core is not excessively soft and thus the resilience is better. In addition, the hardness at the center of the core (Ho) is preferably 70.0 or less, more preferably 68.0 or less, and even more preferably 67.0 or less in Shore C hardness. If the hardness at the center of the core (Ho) is 70.0 or less in Shore C hardness, the core is not excessively hard and thus has better shot feeling.

The diameter of the core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the core is 34.8 mm or more, the cover does not become excessively thick and thus the resilience is better. On the other hand, if the diameter of the core is 42.2 mm or less, the cover does not become excessively thin and thus functions better.

When the core has a diameter in a range of from 34.8 mm to 42.2 mm, the compression deformation amount (shrinking amount along the compression direction) of the core when applying a load from 98 N as an initial load to 1275 N as a final load to the core is preferably 2.0 mm or more, more preferably 2.3 mm or more, and even more preferably 2.5 mm or more, and is preferably 5.0 mm or less, more preferably 4.5 mm or less, and even more preferably 4.3 mm or less. If the compression deformation amount is 2.0 mm or more, the shot feeling is better, and if the compression deformation amount is 5.0 mm or less, the resilience is better.

The core of the golf ball according to the present invention can be obtained by mixing and kneading the above core rubber composition and molding the kneaded core rubber composition in a mold. The molding condition is not particularly limited, but the molding is generally carried out at a temperature ranging from 130° C. to 200° C. and a pressure ranging from 2.9 MPa to 11.8 MPa for 10 to 60 minutes. For example, it is preferable that the core rubber composition is heated at a temperature ranging from 130° C. to 200° C. for 10 to 60 minutes, or alternatively the core rubber composition is heated at a temperature ranging from 130° C. to 150° C. for 20 to 40 minutes and then heated at a temperature ranging from 160° C. to 180° C. for 5 to 15 minutes.

[Cover]

The cover of the golf ball according to the present invention is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Rabalon (registered trademark)" available from Mitsubishi Chemical Corporation.

Examples of the ionomer resin include a product obtained by neutralizing at least a part of carboxyl groups in a binary copolymer composed of an olefin and an α,β-unsaturated carboxylic acid having 3 to 8 carbon atoms with a metal ion; a product obtained by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture thereof. The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, or isobutyl ester of acrylic acid, methacrylic acid, fumaric acid or maleic acid, and acrylic acid ester or methacrylic acid ester is particularly preferred. Among them, as the ionomer resin, a metal ion neutralized product of ethylene-(meth)acrylic acid binary copolymer or a metal ion neutralized product of ethylene-(meth)acrylic acid-(meth)acrylic acid ester ternary copolymer is preferred.

The cover composition for forming the cover of the golf ball according to the present invention preferably contains a thermoplastic polyurethane elastomer or an ionomer resin as the resin component. It is also preferred that when the ionomer resin is used, a thermoplastic styrene elastomer is used in combination. The amount of the polyurethane or ionomer resin in the resin component of the cover composition is preferably 50 mass % or more, more preferably 60 mass % or more, and even more preferably 70 mass % or more.

In addition to the resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the resultant cover. In addition, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and even more preferably 60 or more in shore D hardness, and preferably has a slab hardness of 80 or less, more preferably 70 or less, and even more preferably 68 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more, and even more preferably 30 or more in shore D hardness. If the cover composition has a slab hardness of less than 50 in Shore D hardness, the obtained golf ball readily stops on the green due to the high spin rate on approach shots. In addition, if the cover composition has a slab hardness of 20 or more in Shore D hardness, the abrasion resistance is enhanced. In case of a plurality of cover layers, the slab hardness of the cover composition constituting each layer may be identical or different.

Examples of the method of molding the cover of the golf ball according to the present invention include a method which comprises molding the cover composition into a hollow shell, covering the core with a plurality of the hollow shells and performing compression molding (preferably a method which comprises molding the cover composition into a hollow half-shell, covering the core with two of the half-shells and performing compression molding); and a method which comprises injection molding the cover composition directly onto the core.

When molding the cover in a compression molding method, molding of the half shell can be performed by either the compression molding method or the injection molding method, and the compression molding method is preferred. Compression molding the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, the half shell having a uniform thickness can be formed. Examples of the method for molding the cover by using the half shell include a method which comprises covering the core with two of the half shells and then performing compression molding. Compression molding half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness can be formed.

In the case of injection molding the cover composition into the cover, the cover composition extruded in a pellet form may be used for injection molding, or the cover materials such as the base resin components and the pigment may be dry blended, followed by directly injection molding the blended material. It is preferred to use upper and lower molds having a hemi-spherical cavity and pimples for forming the cover, wherein a part of the pimples also serves as a retractable hold pin. When molding the cover by injection molding, the hold pin is protruded to hold the core, the cover composition is charged and then cooled to obtain the cover. For example, the cover composition heated at a temperature ranging from 200° C. to 250° C. is charged into a mold held under a pressure of 9 MPa to 15 MPa for 0.5 to 5 seconds, and after cooling for 10 to 60 seconds, the mold is opened to obtain the cover.

Concave portions called "dimples" are usually formed on the surface of the cover when the cover is molded. The total number of dimples is preferably 200 or more and 500 or less. If the total number of dimples is less than 200, the dimple effect is hardly obtained. On the other hand, if the total number of dimples exceeds 500, the dimple effect is hardly obtained because the size of the respective dimples is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The thickness of the cover is preferably 4.0 mm or less, more preferably 3.0 mm or less, and even more preferably 2.0 mm or less. If the cover has a thickness of 4.0 mm or less, the resultant golf ball has better resilience and shot feeling. The thickness of the cover is preferably 0.3 mm or more, more preferably 0.5 mm or more, and even more preferably 0.8 mm or more. If the cover has a thickness of less than 0.3 mm, the durability or wear resistance of the cover may be lowered. In the case that the golf ball comprises a plurality of cover layers, the total thickness of a plurality of cover layers preferably falls within the above range.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

The construction of the golf ball according to the present invention is not particularly limited, as long as the golf ball comprises a core and at least one cover layer covering the core. The FIGURE is a partially cutaway cross-sectional view of a golf ball 1 according to one embodiment of the present invention. The golf ball 1 comprises a spherical core 2, and a cover 3 covering the spherical core 2. A plurality of dimples 31 are formed on the surface of the cover. Other portions than the dimples 31 on the surface of the golf ball 1 are lands 32. The golf ball 1 is provided with a paint layer and a mark layer on an outer side of the cover 3, but these layers are not depicted.

The core is preferably spherical. In addition, the construction of the core may be either a single layered construction or a multiple layered construction, and the single layered construction is preferable. Unlike the multiple layered core, the single layered core does not have an energy loss at the interface of the multiple layered core when being hit, and thus has better resilience. In addition, the cover has a construction composed of at least one layer, and may have either a single layered construction or a multiple layered construction composed of at least two layers. Examples of the golf ball according to the present invention include a two-piece golf ball composed of a core and a single layered cover disposed around the core, a multi-piece golf ball (including a three-piece golf ball) composed of a core and at least two cover layers disposed around the core, and a wound golf ball composed of a core, a rubber thread layer formed around the core and a cover disposed around the rubber thread layer. The present invention can be suitably applied to any one of the above golf balls.

The golf ball according to the present invention preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball according to the present invention preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball according to the present invention has a diameter in a range of from 40 mm to 45 mm, the compression deformation amount (shrinking amount along the compression direction) of the golf ball when applying a load from an initial load of 98 N to a final load of 1275 N to the golf ball is preferably 2.0 mm or more, more preferably 2.3 mm or more, and even more preferably 2.5 mm or more, and is preferably 4.0 mm or less, more preferably 3.5 mm or less, and even more preferably 3.3 mm or less. If the compression deformation amount is 2.0 mm or more, the golf ball does not become excessively hard, and thus the shot feeling is better. On the other hand, if the compression deformation amount is 4.0 mm or less, the resilience is better.

Examples

Next, the present invention will be described in detail by way of examples. However, the present invention is not limited to the examples described below. Various changes and modifications without departing from the spirit of the present invention are included in the scope of the present invention.

[Evaluation Method]
(1) Crosslinking Density (Mol/m³)

A circular flat plate with a thickness of 2 mm was obtained by cutting the core in a manner of passing through the geometric center of the core. Then, a measurement point in a region within 4 mm from each part respectively responding to the core center and the core surface, was punched from the circular flat plate with a puncher to obtain a sample of φ 3 mm, and the weight of the sample was measured with an electronic scale that can measure a weight in a unit of two decimal places (mg). The above sample and 8 ml of toluene were added in a 10 ml-vial bottle, the vial bottle was sealed by a plug, and the sealed vial bottle was left for at least 72 hours. After that, the solution was discarded, and the weight of the sample after the immersion was measured. The crosslinking density of the rubber composition was calculated based on the weight of the sample before and after the swelling according to the formula of Flory-Rehner.

$$v = -(\ln(1-v_r) + v_r + \chi v_r^2)/Vs(v_r^{1/3} - v_r/2)$$

[v: crosslinking density, $v_r$: rubber volume fraction during swelling, $\chi$: interaction constant, Vs: molar volume of toluene]

$$v_r = V_{BR}/(V_{BR} + V_T)$$

$$V_{BR} = (w_f - w_f V_f)/\rho$$

$$V_T = (w_s - w_f)/\rho_T$$

[$V_{BR}$: volume of BR (butadiene rubber) in rubber composition, $V_T$: volume of swelled toluene, $v_f$: weight fraction of filler in rubber composition, $\rho$: density of rubber composition, $w_f$: weight of sample before immersion, $w_s$: weight of sample after immersion, $\rho_T$: density of toluene]

It is noted that the calculation was conducted by adopting Vs as $0.1063 \times 10^{-3}$ m³/mol, $\rho_T$ as 0.8669, and $\chi$ as 0.47 based on the literature (Macromolecules 2007, 40, 3669-3675).

(2) Compression Deformation Amount (Mm)

The deformation amount along the compression direction of the core or golf ball (shrinking amount along the compression direction of the core or golf ball), when applying a load from an initial load of 98 N to a final load of 1275 N to the core or golf ball, was measured.

(3) Core Hardness (Shore C Hardness)

The core hardness was measured with an automatic hardness tester Digitest II available from Bareiss company. The Shore C hardness measured at the surface of the core was adopted as the core surface hardness. In addition, the core was cut into two equal hemispheres to obtain a cut plane, and hardness values at the central point of the cut plane and at points of 25%, 50% and 75% of the core radius from the central point were measured. It is noted that the hardness at the point of 25%, 50% or 75% of the core radius from the central point was obtained by measuring hardness values at four points having a distance of 25%, 50% or 75% of the core radius from the central point of the cut plane and averaging the hardness values measured at the four points.

(4) Slab Hardness

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(5) Durability

A W #1 driver provided with a metal head (XXIO S, loft angel: 11°, available from Sumitomo Rubber Industries, Ltd.) was installed on a swing robot M/C available from Golf Laboratories, Inc. The golf ball was hit repeatedly at a head speed of 45 m/sec until a crack occurred, and the number of hitting times when the crack occurred was counted. It is noted that the measurement was conducted using twelve samples for each golf ball, and the average value thereof was adopted as the number of hitting times for that golf ball. It is noted that the number of hitting times of the golf ball No. 15 was defined as 100, and the durability of each golf ball was represented by converting the number of hitting times of each golf ball into this index, and evaluated according to the following standard.

E (Excellent): 115 or more
G (Good): 105 or more and less than 115
F (Fair): 95 or more and less than 105
P (Poor): less than 95

(6) Shot Feeling

An actual hitting test was carried out by ten amateur golfers (high skilled person) using a driver. Feeling at the shot was evaluated by each person based on the following standard. Major result of the evaluations of ten golfers was employed as the shot feeling of the golf ball.

Evaluation Standard:
E (Excellent): Impact is low and feeling is good.
G (Good): there is impact but feeling is the good one.
F (Fair): Normal feeling.
P (Poor): Impact is great and feeling is poor.

[Production of Golf Ball]
(1) Production of Core

According to the formulations shown in Tables 1 and 2, the rubber compositions were kneaded with a kneading roll, and heat-pressed in upper and lower molds, each having a hemispherical cavity, at the temperature of 170° C. for 30 minutes to produce spherical cores having a diameter of 39.7 mm. It is noted that barium sulfate was added in an appropriate amount such that the obtained golf balls had a mass of 45.3 g.

TABLE 1

| | | Golf ball No. | 1 | 2 | 3 | 4 | 5 | 6 |
|---|---|---|---|---|---|---|---|---|
| Core rubber composition | Formulation (parts by mass) | (a) BR730 | 100 | 100 | 100 | 100 | 100 | 100 |
| | | (b) ZDA | 32 | 36 | 40 | 44 | 48 | 52 |
| | | (c) Dicumyl peroxide | 0.8 | 0.8 | 0.8 | 0.8 | 0.8 | 0.8 |
| | | (f) Zinc oxide | 5.0 | 5.0 | 5.0 | 5.0 | 5.0 | 5.0 |
| | | (d) YS POLYSTER T130 | 1 | 5 | 10 | 15 | 20 | 25 |
| | | (f) Barium sulfate | * | * | * | * | * | * |
| Core property | Compression deformation amount (mm) | | 3.3 | 3.3 | 3.3 | 3.3 | 3.3 | 3.3 |
| | Center hardness Ho (Shore C) | | 58.9 | 59.4 | 57.0 | 55.0 | 55.0 | 55.0 |
| | Hardness H25 at 25% point (Shore C) | | 71.1 | 70.9 | 70.0 | 68.0 | 68.0 | 60.0 |
| | Hardness H50 at 50% point (Shore C) | | 72.3 | 73.0 | 70.8 | 69.2 | 69.0 | 62.0 |
| | Hardness H75 at 75% point (Shore C) | | 73.0 | 73.8 | 71.0 | 70.1 | 70.0 | 63.0 |

TABLE 1-continued

| | Golf ball No. | 1 | 2 | 3 | 4 | 5 | 6 |
|---|---|---|---|---|---|---|---|
| | Surface hardness Hs (Shore C) | 78.0 | 74.0 | 71.4 | 70.5 | 70.1 | 63.1 |
| | H50-Ho | 13.4 | 13.6 | 13.8 | 14.2 | 14.0 | 7.0 |
| | Hs-H50 | 5.7 | 1.0 | 0.6 | 1.3 | 1.1 | 1.1 |
| | Hs-Ho | 19.1 | 14.6 | 14.4 | 15.5 | 15.1 | 8.1 |
| | Crosslinking density vo at center of core ($\times 10^2$ mol/m$^3$) | 9.3 | 7.4 | 8.5 | 8.0 | 8.0 | 7.5 |
| | Crosslinking density vs at surface of core ($\times 10^2$ mol/m$^3$) | 22.5 | 13.6 | 11.7 | 11.0 | 10.0 | 8.5 |
| | Crosslinking density vs at surface of core-crosslinking density vo at center of core | 13.2 | 6.2 | 3.2 | 3.0 | 2.0 | 1.0 |
| Golf ball | Compression deformation amount (mm) | 3.0 | 3.0 | 3.0 | 3.0 | 3.0 | 3.0 |
| | Durability | F | G | G | G | G | P |
| | Shot feeling on driver shots | F | E | E | E | G | F |

*Appropriate amount

TABLE 2

| | Golf ball No. | | 7 | 8 | 9 | 10 | 11 | 12 | 13 | 14 | 15 |
|---|---|---|---|---|---|---|---|---|---|---|---|
| Rubber composition | Amount (parts by mass) | (a) BR730 | 100 | 100 | 100 | 100 | 100 | 100 | 100 | 100 | 100 |
| | | (b) ZDA | 27.8 | 27.8 | 30.7 | 34.4 | 36.6 | 44.1 | 51.4 | 58.7 | 29.0 |
| | | (c) Dicumyl peroxide | 0.8 | 0.8 | 0.8 | 0.8 | 0.8 | 0.8 | 0.8 | 0.8 | 0.8 |
| | | (f) Zinc oxide | 5.0 | 5.0 | 5.0 | 5.0 | 5.0 | 5.0 | 5.0 | 5.0 | 5 |
| | | (d) BHT | 0.1 | 0.5 | 1 | 3 | 5 | 10 | 15 | 20 | 0 |
| | | (f) Barium sulfate | * | * | * | * | * | * | * | * | * |
| Core property | Compression deformation amount (mm) | | 3.3 | 3.3 | 3.3 | 3.3 | 3.3 | 3.3 | 3.3 | 3.3 | 3.3 |
| | Center hardness Ho (Shore C) | | 58.9 | 58.9 | 61.1 | 60.2 | 58.0 | 55.0 | 55.0 | 55.0 | 58.9 |
| | Hardness H25 at 25% point (Shore C) | | 71.1 | 71.1 | 73.3 | 72.4 | 70.2 | 68.0 | 68.0 | 66.0 | 71.1 |
| | Hardness H50 at 50% point (Shore C) | | 72.3 | 72.3 | 74.5 | 73.6 | 71.4 | 68.4 | 70.0 | 68.0 | 72.3 |
| | Hardness H75 at 75% point (Shore C) | | 73.0 | 73.0 | 75.3 | 75.0 | 72.8 | 69.8 | 72.0 | 69.0 | 73.0 |
| | Surface hardness Hs (Shore C) | | 79.5 | 79.5 | 80.0 | 80.0 | 80.0 | 78.0 | 74.0 | 70.0 | 79.5 |
| | H50-Ho | | 13.4 | 13.4 | 13.4 | 13.4 | 13.4 | 13.4 | 15.0 | 13.0 | 13.4 |
| | Hs-H50 | | 7.2 | 7.2 | 5.5 | 6.4 | 8.6 | 9.6 | 4.0 | 2.0 | 7.2 |
| | Hs-Ho | | 20.6 | 20.6 | 18.9 | 19.8 | 22.0 | 23.0 | 19.0 | 15.0 | 20.6 |
| | Crosslinking density vo at center of core ($\times 10^2$ mol/m$^3$) | | 9.3 | 9.3 | 9.3 | 9.3 | 9.4 | 9.3 | 9.3 | 9.3 | 9.3 |
| | Crosslinking density vs at surface of core ($\times 10^2$ mol/m$^3$) | | 23.2 | 23.2 | 18.1 | 18.0 | 16.9 | 13.0 | 12.0 | 10.0 | 23.2 |
| | Crosslinking density vs at surface of core-crosslinking density vo at center of core | | 13.8 | 13.8 | 8.8 | 8.7 | 7.6 | 3.7 | 2.7 | 0.7 | 13.8 |
| Golf ball | Compression deformation amount (mm) | | 3.0 | 3.0 | 3.0 | 3.0 | 3.0 | 3.0 | 3.0 | 3.0 | 3.0 |
| | Durability | | F | F | G | E | E | E | G | P | F |
| | Shot feeling on driver shots | | F | F | G | E | E | G | F | F | F |

*Appropriate amount

The materials used in Tables 1 and 2 are shown as follows.

BR730: high-cis polybutadiene rubber (cis-1,4 bond amount=95 mass %, 1,2-vinyl bond amount=1.3 mass %, Moony viscosity (ML$_{1+4}$ (100° C.))=55, molecular weight distribution (Mw/Mn)=3) available from JSR Corporation ZDA: zinc acrylate (surface treated with zinc stearate in an amount of 10%) available from Nisshoku Techno Fine Chemical Co., Ltd.

Dicumyl peroxide: (one-minute half-life temperature: 175.2° C.) available from Tokyo Chemical Industry Co., Ltd.

Zinc oxide: White Seal available from Pt. Indo Lysaght

Barium sulfate: "Barium sulfate BD" available from Sakai Chemical Industry Co., Ltd.

BHT: dibutylhydroxy toluene available from Tokyo Zairyo Co., Ltd.

YS POLYSTER T130: terpene phenolic resin (softening point: 130±5° C.)) available from Yasuhara Chemical Co., Ltd.

(2) Production of Cover and Production of Golf Ball

The cover material having the formulation shown in Table 3 was extruded with a twin-screw kneading type extruder to prepare the cover composition in a pellet form. The conditions for extruding the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above such that the formed cover had a thickness of 1.5 mm, to produce golf balls having the spherical core and the cover covering the core. Evaluation results of the obtained golf balls are shown in Tables 1 and 2.

TABLE 3

| Cover composition No. | 1 |
|---|---|
| Himilan 1555 | 40 |
| Himilan 1605 | 20 |
| Himilan AM7329 | 40 |
| Titanium dioxide (A220) | 3 |
| JF-90 | 0.2 |
| Hardness (Shore D) | 63 |

Formulation: Parts by Mass

The materials used in Table 3 are shown as follows.

Himilan 1555: Na neutralized ionomer available from Du Pont-Mitsui Polychemicals Co., Ltd.

Himilan 1605: Na neutralized ionomer available from Du Pont-Mitsui Polychemicals Co., Ltd.

Himilan AM7329: Zn neutralized ionomer available from Du Pont-Mitsui Polychemicals Co., Ltd.

A-220: titanium dioxide available from Ishihara Sangyo Kaisha, Ltd.

JF-90: light stabilizer available from Johoku Chemical Co., Ltd.

It can be seen from the results shown in Tables 1 and 2 that each of the golf balls according to the present invention has excellent durability and good shot feeling.

The present invention can be suitably used as a golf ball.

This application is based on Japanese patent application No. 2020-057918 filed on Mar. 27, 2020, the contents of which are hereby incorporated by reference.

The invention claimed is:

1. A golf ball comprising a core and at least one cover layer covering the core, wherein
    the core is formed from a core rubber composition containing (a) a base rubber, (b) an α,β-unsaturated carboxylic acid having 3 to 8 carbon atoms and/or a metal salt thereof as a co-crosslinking agent, and (c) a crosslinking initiator,
    a difference (crosslinking density at surface of core−crosslinking density at center of core) between a crosslinking density at a surface of the core and a crosslinking density at a center of the core is more than $1.0 \times 10^2$ $mol/m^3$ and less than $9.0 \times 10^2$ $mol/m^3$, and
    a hardness difference (Hs−Ho) between Hs and Ho is 13.0 or more and 30.0 or less, and the core satisfies H50−Ho>Hs−H50, wherein Hs (Shore C hardness) is a hardness at the surface of the core, Ho (Shore C hardness) is a hardness at the center of the core, and H50 (Shore C hardness) is a hardness at a midpoint between the center of the core and the surface of the core.

2. The golf ball according to claim 1, wherein the crosslinking density at the surface of the core is $9.0 \times 10^2$ $mol/m^3$ or more and $22.0 \times 10^2$ $mol/m^3$ or less.

3. The golf ball according to claim 1, wherein the crosslinking density at the center of the core is $4.0 \times 10^2$ $mol/m^3$ or more and $13.0 \times 10^2$ $mol/m^3$ or less.

4. The golf ball according to claim 1, wherein the hardness Hs at the surface of the core is 60.0 or more and 90.0 or less in Shore C hardness.

5. The golf ball according to claim 1, wherein the hardness difference (H50−Ho) between the hardness H50 at the midpoint of the core and the hardness Ho at the center of the core is 1.0 or more and 20.0 or less in Shore C hardness.

6. The golf ball according to claim 1, wherein the hardness difference (Hs−H50) between the hardness Hs at the surface of the core and the hardness H50 at the midpoint of the core is 0 or more and 15.0 or less in Shore C hardness.

7. The golf ball according to claim 1, wherein the core rubber composition contains at least one additive (d) selected from the group consisting of (d1) a hindered phenol-based compound, (d2) a hindered amine-based compound, and (d3) a terpene-based resin.

8. The golf ball according to claim 7, wherein the core rubber composition contains (d1) the hindered phenol-based compound and/or (d2) the hindered amine-based compound in an amount of from 1 part by mass to 15 parts by mass with respect to 100 parts by mass of (a) the base rubber.

9. The golf ball according to claim 7, wherein (d1) the hindered phenol-based compound is at least one member selected from the group consisting of dibutylhydroxy toluene, octadecyl-3-(3,5-di-tert-butyl-4-hydroxyphenyl) propionate, 4,4'-methylene bis(2,6-di-tert-butylphenol), 2,6-di-tert-butyl-4-({2-[(3,5-di-tert-butyl-4-hydroxyphenyl) sulfanyl] propane-2-yl} sulfanyl) phenol, 1,3,5-tris(3,5-di-tert-butyl-4-hydroxybenzyl)-1,3,5-triazine-2,4,6-(1H,3H, 5H)-trione, and pentaerythritol tetrakis[3-(3,5-di-tert-butyl-4-hydroxyphenyl) propionate.

10. The golf ball according to claim 7, wherein (d2) the hindered amine-based compound is a compound having a 2,2,6,6-tetramethyl-4-piperidyl group represented by a chemical formula (1):

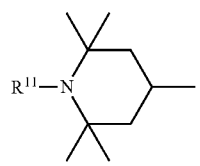

(1)

in the formula (1), $R^{11}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

11. The golf ball according to claim 10, wherein (d2) the hindered amine-based compound is at least one member selected from the group consisting of compounds represented b chemical formulae (4) to (6):

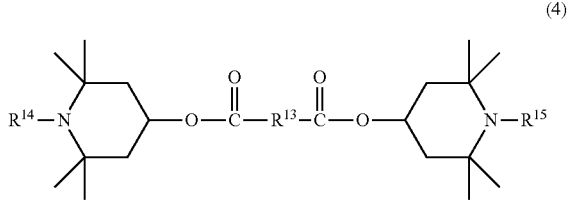

(4)

in the chemical formula (4), $R^{14}$ and $R^{15}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical, and $R^{13}$ is an alkylene group having 1 to 20 carbon atoms;

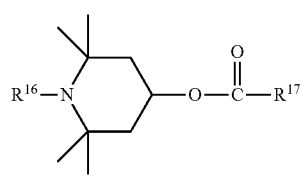

(5)

in the chemical formula (5), $R^{16}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical, and $R^{17}$ is an alkyl group having 1 to 30 carbon atoms, or an alkenyl group having 2 to 30 carbon atoms;

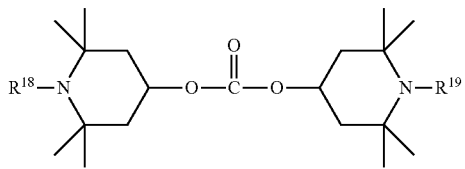
(6)

in the chemical formula (6), $R^{18}$ and $R^{19}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

12. The golf ball according to claim 7, wherein (d3) the terpene-based resin includes at least one member selected from the group consisting of compounds having a structure represented by the following chemical formulae (7) to (10);

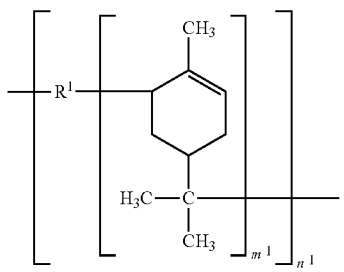
(7)

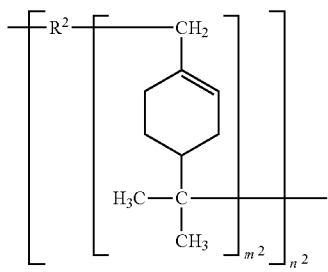
(8)

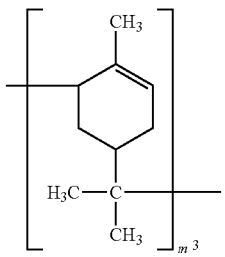
(9)

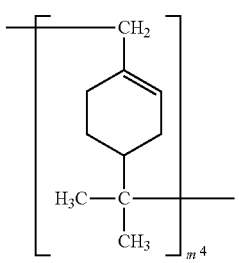
(10)

in the chemical formulae (7) to (10), $R^1$ and $R^2$ each independently represent a divalent residue of the phenol-based compound and/or styrene-based compound, $m^1$ to $m^4$ each independently represent a natural number of 1 to 30, and $n^1$ to $n^2$ each independently represent a natural number of 1 to 20.

13. The golf ball according to claim 7, wherein (d3) the terpene-based resin includes at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

14. The golf ball according to claim 7, wherein the core rubber composition contains (d3) the terpene-based resin in an amount of from 2 parts by mass to 20 parts by mass with respect to 100 parts by mass of (a) the base rubber.

15. The golf ball according to claim 14, wherein a mass ratio of the component (b) to the component (d3) (the component (b)/the component (d3)) is 2.0 or more and 15.0 or less.

16. The golf ball according to claim 1, wherein the hardness Ho at the center of the core is 30.0 or more and 70.0 or less in Shore C hardness.

* * * * *